United States Patent
Bleuzen et al.

(10) Patent No.: US 8,757,968 B2
(45) Date of Patent: Jun. 24, 2014

(54) OPTIMIZED AERODYNAMIC PROFILE FOR A TURBINE VANE, IN PARTICULAR FOR A NOZZLE OF THE THIRD STAGE OF A TURBINE

(75) Inventors: Jean Bleuzen, Guignes (FR); Jean-Michel Guimbard, Cely en Biere (FR); Ludovic Pintat, Alfortville (FR); Pascal Routier, Le Mee sur Seine (FR)

(73) Assignee: Snecma, Paris (FR)

( * ) Notice: Subject to any disclaimer, the term of this patent is extended or adjusted under 35 U.S.C. 154(b) by 541 days.

(21) Appl. No.: 13/170,239

(22) Filed: Jun. 28, 2011

(65) Prior Publication Data

US 2012/0020800 A1    Jan. 26, 2012

Related U.S. Application Data

(60) Provisional application No. 61/367,687, filed on Jul. 26, 2010.

(51) Int. Cl.
*F01D 9/04* (2006.01)

(52) U.S. Cl.
USPC ..... 415/193; 415/191; 415/199.5; 415/209.1; 415/210.1; 415/211.2

(58) Field of Classification Search
CPC ........... F01D 5/141; F01D 5/142; F01D 9/02; F01D 9/04; F01D 9/041; F05D 2250/74
USPC ................ 415/191–193, 199.4–199.5, 208.1, 415/208.2, 209.1, 209.2–209.4, 210.1, 415/211.2; 416/223 R, 223 A, 243, DIG. 2, 416/DIG. 5
See application file for complete search history.

(56) References Cited

U.S. PATENT DOCUMENTS

| | | | |
|---|---|---|---|
| 6,461,109 B1 | 10/2002 | Wedlake et al. | |
| 6,736,599 B1 * | 5/2004 | Jacks et al. | 415/191 |
| 6,779,980 B1 * | 8/2004 | Brittingham et al. | 416/243 |
| 2005/0013695 A1 * | 1/2005 | Hyde et al. | 416/243 |
| 2005/0019160 A1 * | 1/2005 | Hyde et al. | 415/213.1 |
| 2005/0025618 A1 * | 2/2005 | Arness et al. | 415/191 |

(Continued)

FOREIGN PATENT DOCUMENTS

| | | |
|---|---|---|
| EP | 1 455 053 A2 | 9/2004 |
| EP | 1 503 037 A2 | 2/2005 |
| EP | 1 961 916 A1 | 8/2008 |

OTHER PUBLICATIONS

U.S. Appl. No. 13/171,653, filed Jun. 29, 2011, Guimbard, et al.

(Continued)

*Primary Examiner* — Christopher Verdier
(74) *Attorney, Agent, or Firm* — Oblon, Spivak, McClelland, Maier & Neustadt, L.L.P.

(57) ABSTRACT

When cold and in the non-coated state, the aerodynamic profile is substantially identical to a nominal profile determined by the Cartesian coordinates X,Y,Z' given in Table 1, in which the coordinate Z' is the quotient D/H where D is the distance of the point under consideration from a first reference plane P0 situated at the base of the nominal profile, and H is the height of the profile measured from the first reference plane to a second reference plane P1. The measurements D and H are taken radially relative to the axis of the turbine, while the X coordinate is measured in the axial direction of the turbine.

11 Claims, 2 Drawing Sheets

(56) References Cited

U.S. PATENT DOCUMENTS

| | | |
|---|---|---|
| 2007/0154316 A1 | 7/2007 | Clarke |
| 2007/0248465 A1* | 10/2007 | Botrel et al. ............... 416/223 A |
| 2008/0206061 A1 | 8/2008 | Lafarge et al. |
| 2009/0035145 A1* | 2/2009 | DeLong et al. ........... 416/223 A |
| 2010/0040475 A1* | 2/2010 | Boquet et al. ............. 416/223 R |
| 2011/0076150 A1* | 3/2011 | Grafitti et al. ............. 416/223 R |

OTHER PUBLICATIONS

U.S. Appl. No. 13/171,561, filed Jun. 29, 2011, Girard, et al.
U.S. Appl. No. 13/171,734, filed Jun. 29, 2011, Bleuzen, et al.
U.S. Appl. No. 13/171,586, filed Jun. 29, 2011, Girard, et al.
U.S. Appl. No. 13/170,225, filed Jun. 28, 2011, Bleuzen, et al.
U.S. Appl. No. 13/171,758, filed Jun. 29, 2011, Girard, et al.

* cited by examiner

OPTIMIZED AERODYNAMIC PROFILE FOR A TURBINE VANE, IN PARTICULAR FOR A NOZZLE OF THE THIRD STAGE OF A TURBINE

The present invention relates to an aerodynamic profile for a turbine vane.

In particular, the invention relates to the aerodynamic profile of a nozzle vane forming a portion of the stator of a gas turbine, and more particularly of a low pressure turbine of the type used in a turbojet of an aircraft.

The invention relates in particular to a nozzle vane of the third stage of a turbine having a plurality of stages, preferably four stages.

Such a profile should enable the turbine to provide the desired efficiency, and in order to do that it must be such that the flow of air around the profile is sound, i.e. substantially such that it does not give rise to turbulence, which is harmful for overall efficiency.

It must be capable of being installed properly in the environment of the engine, and in particular, for a nozzle vane forming a portion of the stator of the turbine, it must be capable of being fastened easily to the sectors of the foot platform (the zone of the vane that is furthest from the axis of rotation of the turbine) and of the head platform (the zone that is closest to said axis). Furthermore, this part must be capable of being obtained by casting, and must therefore present a profile that is compatible with that manufacturing technique.

Furthermore, the profile of the vane must enable it to withstand the mechanical stresses to which the vane is subjected, by enabling those stresses to be spread over the entire vane in such a manner as to avoid premature wear thereof. This spreading must apply both in static mode and in dynamic mode.

An object of the invention is to propose an aerodynamic profile for a turbine vane that is optimized, and capable of satisfying those objectives.

This object is achieved by the fact that when cold and in a non-coated state, said profile is substantially identical to a nominal profile determined by the Cartesian coordinates X,Y, Z' given in Table 1, in which the coordinate Z' is the quotient D/H where D is the distance of the point under consideration from a reference X,Y plane situated at the base of the nominal profile, and H is the height of said profile measured from said reference plane that is the intersection of the stacking axis of the set of vanes and the axisymmetric surface of the hub, out to a second reference plane that is the intersection of said stacking axis with the axisymmetric surface of the casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the invention is defined in the non-coated state. Since turbine vanes are subjected to high temperature gradients, it is common practice for them to be provided with a coating having thermal properties enabling them more easily to withstand such temperature variations. The profile is determined prior to installing such a coating.

It is stated above that the profile of the invention is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

This variation takes account in particular of manufacturing tolerances of the profile.

It is also preferable for the X,Y coordinates of the aerodynamic profile to lie within a range of ±5 relative to the X,Y coordinates of the nominal profile.

This variation takes account of the setting of the profile to adapt to the flow coming from the blades of the turbine situated upstream, so as to further improve the efficiency of the turbine. In particular, the profile is adapted so as to be optimized for the flow coming from the rotary wheel of the second stage of a turbine when the vane of the invention belongs to the nozzle of the third stage of a turbine.

With a nozzle vane, i.e. a portion of the stator of a turbine, the profile serves to orient the fluid correctly for the turbine blades that are situated downstream, and that belong in particular to the rotary wheel of the third stage of the turbine.

The invention can be better understood and its advantages appear better on reading the following detailed description of an embodiment given by way of non-limiting example. The description refers to the accompanying drawings, in which.

Figure 1:
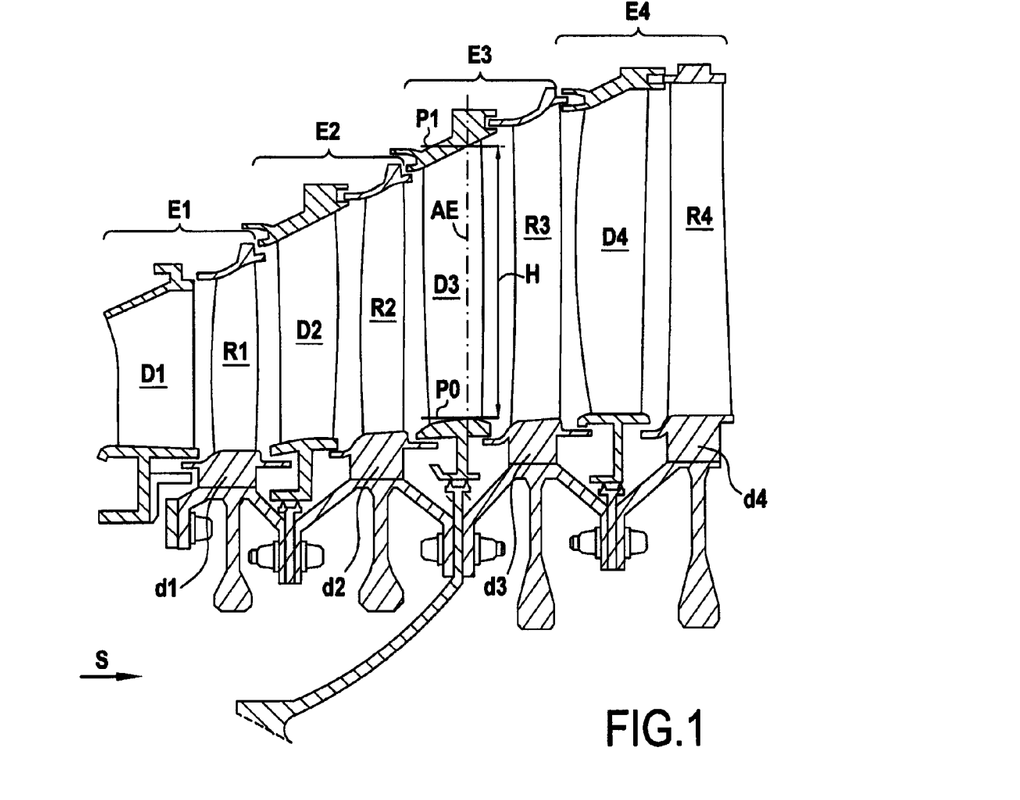
FIG. 1 is a fragmentary axial section view of a turbine including a vane of profile that corresponds to that of the invention.

The turbine shown in axial section in FIG. 1 comprises four stages referenced respectively E1 to E4. In the direction S going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages E1 to E4 are given references D1 to D4, whereas the blades of rotary wheels of stages E1 to E4 are given respective references R1 to R4.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The disks d1 to d4 forming parts of the wheels R1 to R4 are constrained to rotate together.

The invention relates in particular to a vane D3 which is a vane of the nozzle of the third stage E3 of the turbine that, as mentioned above, preferably comprises four stages, without this number being limiting.

Via its foot 10, which is its end remote from the axis of rotation A (see FIG. 1), the vane is fastened to the outer ring 12 of the turbine, which ring is stationary in rotation. Via its head 14, formed by its end closer to the axis of rotation A, the vane is fastened to an inner shroud 16 of the turbine. By convention, the aerodynamic profile 18 of the vane is the entire portion of said vane that extends radially outwards from its head 14 to its foot 10 without incorporating the fastenings respectively to the outer ring 12 and to the inner shroud 16.

Figure 2:
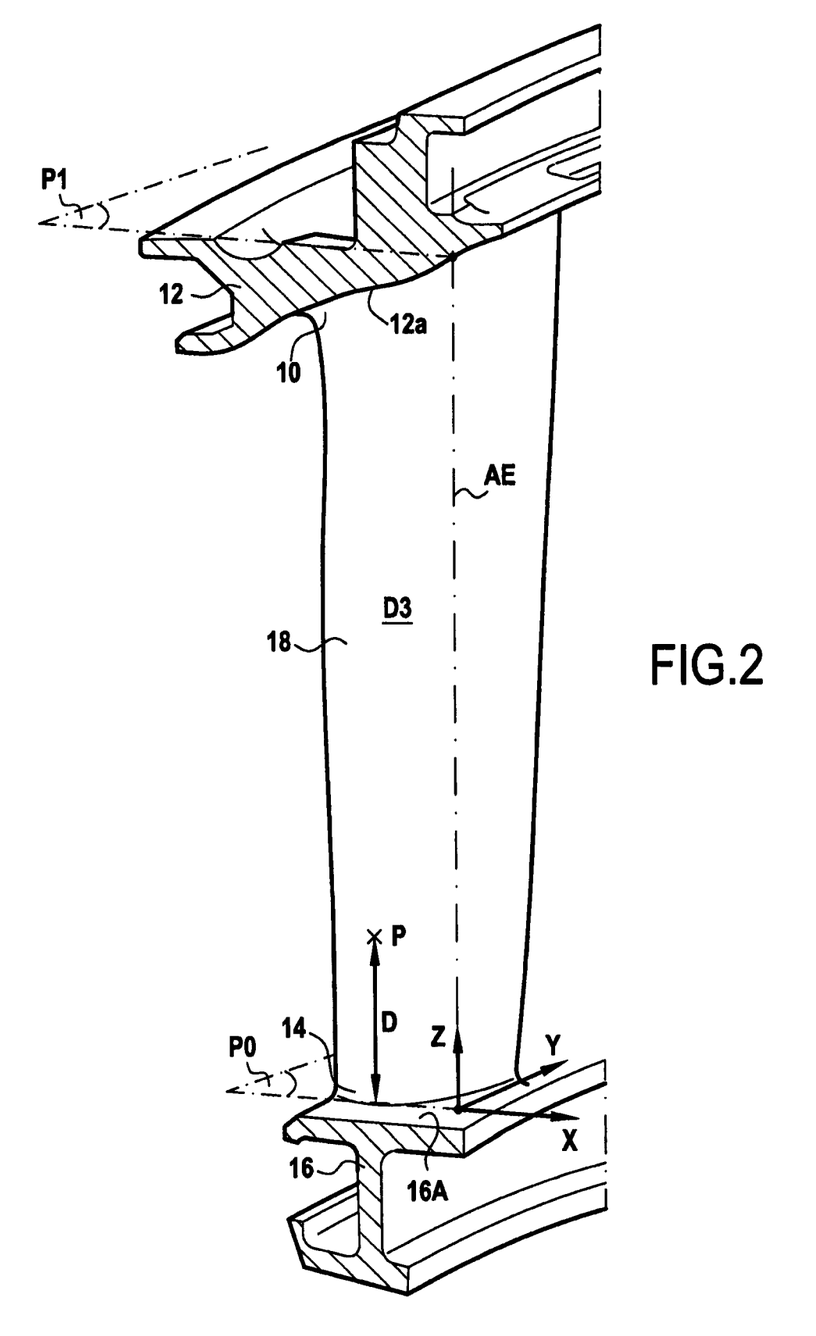
FIG. 2 is a perspective view of a vane to which the invention applies.

In FIG. 2, there can be seen a frame of reference comprising Cartesian coordinates X,Y,Z. The radial direction Z is the height direction of the vane, which extends radially from its head to its foot. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the invention is determined is defined in following Table 1 of coordinates, in which the coordinates Z', measured along the axis Z is non-dimensional, whereas the dimensions X and Y, respectively measured along the axes X and Y, are expressed in millimeters.

TABLE 1

| X | Y | Z' |
|---|---|---|
| −20.59717 | 5.62689 | −0.15 |
| −20.637 | 5.57511 | −0.15 |
| −20.69093 | 5.497 | −0.15 |
| −20.74663 | 5.36152 | −0.15 |
| −20.76967 | 5.15866 | −0.15 |
| −20.73206 | 4.89464 | −0.15 |
| −20.62457 | 4.57962 | −0.15 |
| −20.44604 | 4.21973 | −0.15 |
| −20.19561 | 3.81923 | −0.15 |
| −19.87321 | 3.38144 | −0.15 |
| −19.47749 | 2.91082 | −0.15 |
| −19.00619 | 2.41359 | −0.15 |
| −18.45552 | 1.89917 | −0.15 |
| −17.82158 | 1.37975 | −0.15 |
| −17.10075 | 0.87079 | −0.15 |
| −16.2911 | 0.39026 | −0.15 |
| −15.39326 | −0.04163 | −0.15 |
| −14.4115 | −0.40339 | −0.15 |
| −13.35475 | −0.67478 | −0.15 |
| −12.23627 | −0.83679 | −0.15 |
| −11.07345 | −0.87018 | −0.15 |
| −9.88874 | −0.75627 | −0.15 |
| −8.70951 | −0.48374 | −0.15 |
| −7.56284 | −0.05441 | −0.15 |
| −6.4707 | 0.51466 | −0.15 |
| −5.44678 | 1.19918 | −0.15 |
| −4.50059 | 1.97745 | −0.15 |
| −3.62465 | 2.81499 | −0.15 |
| −2.81131 | 3.68646 | −0.15 |
| −2.05658 | 4.57492 | −0.15 |
| −1.36104 | 5.46956 | −0.15 |
| −0.71198 | 6.35113 | −0.15 |
| −0.10686 | 7.21001 | −0.15 |
| 0.45198 | 8.0409 | −0.15 |
| 0.97085 | 8.83344 | −0.15 |
| 1.44998 | 9.5822 | −0.15 |
| 1.88787 | 10.28365 | −0.15 |
| 2.28654 | 10.93278 | −0.15 |
| 2.64575 | 11.52685 | −0.15 |
| 2.96533 | 12.06396 | −0.15 |
| 3.24623 | 12.54246 | −0.15 |
| 3.48922 | 12.96173 | −0.15 |
| 3.69556 | 13.32204 | −0.15 |
| 3.86684 | 13.62445 | −0.15 |
| 4.00512 | 13.87101 | −0.15 |
| 4.11305 | 14.06459 | −0.15 |
| 4.15312 | 14.22535 | −0.15 |
| 4.12255 | 14.33674 | −0.15 |
| 4.08116 | 14.39681 | −0.15 |
| 4.03954 | 14.43428 | −0.15 |
| 3.99891 | 14.45935 | −0.15 |
| 3.94061 | 14.48082 | −0.15 |
| 3.84224 | 14.48736 | −0.15 |
| 3.71019 | 14.43715 | −0.15 |
| 3.587 | 14.29383 | −0.15 |
| 3.44232 | 14.10108 | −0.15 |
| 3.26476 | 13.86386 | −0.15 |
| 3.05309 | 13.58012 | −0.15 |
| 2.80612 | 13.24891 | −0.15 |
| 2.52366 | 12.86945 | −0.15 |
| 2.20486 | 12.44249 | −0.15 |
| 1.85 | 11.96878 | −0.15 |
| 1.45827 | 11.45074 | −0.15 |
| 1.02884 | 10.89162 | −0.15 |
| 0.56231 | 10.29435 | −0.15 |
| 0.05569 | 9.66538 | −0.15 |
| −0.49188 | 9.01041 | −0.15 |
| −1.08044 | 8.33516 | −0.15 |
| −1.71601 | 7.65165 | −0.15 |
| −2.39925 | 6.96855 | −0.15 |
| −3.13032 | 6.29523 | −0.15 |
| −3.91401 | 5.6481 | −0.15 |
| −4.75268 | 5.04455 | −0.15 |
| −5.64104 | 4.49508 | −0.15 |
| −6.5754 | 4.0158 | −0.15 |
| −7.54799 | 3.6206 | −0.15 |
| −8.54652 | 3.31621 | −0.15 |
| −9.55579 | 3.10034 | −0.15 |
| −10.56143 | 2.96532 | −0.15 |
| −11.55108 | 2.90084 | −0.15 |
| −12.51458 | 2.89845 | −0.15 |
| −13.44305 | 2.95469 | −0.15 |
| −14.3278 | 3.06838 | −0.15 |
| −15.16023 | 3.2374 | −0.15 |
| −15.93236 | 3.45676 | −0.15 |
| −16.63859 | 3.71597 | −0.15 |
| −17.27577 | 4.00268 | −0.15 |
| −17.84336 | 4.30368 | −0.15 |
| −18.34349 | 4.60538 | −0.15 |
| −18.78005 | 4.89559 | −0.15 |
| −19.15818 | 5.16367 | −0.15 |
| −19.48441 | 5.39979 | −0.15 |
| −19.76657 | 5.59394 | −0.15 |
| −20.01263 | 5.73524 | −0.15 |
| −20.2298 | 5.80765 | −0.15 |
| −20.40183 | 5.7963 | −0.15 |
| −20.50943 | 5.73119 | −0.15 |
| −20.56363 | 5.67134 | −0.15 |
| −20.59717 | 5.62689 | −0.15 |
| −20.69429 | 5.91858 | −0.1 |
| −20.73543 | 5.86692 | −0.1 |
| −20.78851 | 5.78697 | −0.1 |
| −20.84099 | 5.64848 | −0.1 |
| −20.85961 | 5.44291 | −0.1 |
| −20.81823 | 5.17651 | −0.1 |
| −20.70789 | 4.8586 | −0.1 |
| −20.52714 | 4.4949 | −0.1 |
| −20.27518 | 4.08924 | −0.1 |
| −19.95208 | 3.64457 | −0.1 |
| −19.55678 | 3.16481 | −0.1 |
| −19.08724 | 2.65565 | −0.1 |
| −18.53974 | 2.1259 | −0.1 |
| −17.91007 | 1.58736 | −0.1 |
| −17.19396 | 1.05539 | −0.1 |
| −16.38839 | 0.54838 | −0.1 |
| −15.4927 | 0.08765 | −0.1 |
| −14.50979 | −0.3032 | −0.1 |
| −13.44761 | −0.60057 | −0.1 |
| −12.31945 | −0.78135 | −0.1 |
| −11.14414 | −0.82319 | −0.1 |
| −9.94662 | −0.70621 | −0.1 |
| −8.75672 | −0.42085 | −0.1 |
| −7.60308 | 0.02794 | −0.1 |
| −6.50777 | 0.6198 | −0.1 |
| −5.48354 | 1.32792 | −0.1 |
| −4.53842 | 2.12847 | −0.1 |
| −3.66513 | 2.98785 | −0.1 |
| −2.85568 | 3.88069 | −0.1 |
| −2.1054 | 4.78955 | −0.1 |
| −1.41408 | 5.70311 | −0.1 |
| −0.76997 | 6.60312 | −0.1 |
| −0.17001 | 7.47962 | −0.1 |
| 0.38409 | 8.32684 | −0.1 |
| 0.89809 | 9.1349 | −0.1 |
| 1.37255 | 9.89814 | −0.1 |
| 1.80628 | 10.61282 | −0.1 |
| 2.20109 | 11.27405 | −0.1 |
| 2.55694 | 11.87901 | −0.1 |
| 2.87368 | 12.42574 | −0.1 |
| 3.1522 | 12.91264 | −0.1 |
| 3.39329 | 13.33913 | −0.1 |

TABLE 1-continued

| X | Y | Z' |
|---|---|---|
| 3.59815 | 13.70552 | −0.1 |
| 3.76831 | 14.01293 | −0.1 |
| 3.90576 | 14.2635 | −0.1 |
| 4.01307 | 14.4602 | −0.1 |
| 4.05103 | 14.6233 | −0.1 |
| 4.01828 | 14.73543 | −0.1 |
| 3.97537 | 14.79539 | −0.1 |
| 3.9326 | 14.83248 | −0.1 |
| 3.89094 | 14.85703 | −0.1 |
| 3.83145 | 14.87751 | −0.1 |
| 3.73171 | 14.88179 | −0.1 |
| 3.59956 | 14.82715 | −0.1 |
| 3.47801 | 14.67933 | −0.1 |
| 3.33514 | 14.48145 | −0.1 |
| 3.15982 | 14.23793 | −0.1 |
| 2.9508 | 13.94669 | −0.1 |
| 2.70695 | 13.60672 | −0.1 |
| 2.42802 | 13.21727 | −0.1 |
| 2.1132 | 12.77903 | −0.1 |
| 1.76274 | 12.2928 | −0.1 |
| 1.37579 | 11.76097 | −0.1 |
| 0.95159 | 11.18673 | −0.1 |
| 0.49057 | 10.57316 | −0.1 |
| −0.01018 | 9.92653 | −0.1 |
| −0.55155 | 9.2525 | −0.1 |
| −1.13392 | 8.55705 | −0.1 |
| −1.76308 | 7.85173 | −0.1 |
| −2.4399 | 7.14522 | −0.1 |
| −3.16512 | 6.44734 | −0.1 |
| −3.94358 | 5.77411 | −0.1 |
| −4.77787 | 5.1426 | −0.1 |
| −5.66366 | 4.56442 | −0.1 |
| −6.59787 | 4.05642 | −0.1 |
| −7.57339 | 3.63377 | −0.1 |
| −8.57817 | 3.30537 | −0.1 |
| −9.59692 | 3.07189 | −0.1 |
| −10.61441 | 2.92865 | −0.1 |
| −11.61684 | 2.86724 | −0.1 |
| −12.59246 | 2.8791 | −0.1 |
| −13.53106 | 2.95839 | −0.1 |
| −14.42314 | 3.10044 | −0.1 |
| −15.2599 | 3.29969 | −0.1 |
| −16.03373 | 3.54852 | −0.1 |
| −16.73959 | 3.83513 | −0.1 |
| −17.37496 | 4.1465 | −0.1 |
| −17.93986 | 4.46924 | −0.1 |
| −18.43685 | 4.78994 | −0.1 |
| −18.87019 | 5.09659 | −0.1 |
| −19.24541 | 5.37862 | −0.1 |
| −19.56917 | 5.62658 | −0.1 |
| −19.84923 | 5.83123 | −0.1 |
| −20.09342 | 5.9828 | −0.1 |
| −20.30816 | 6.06806 | −0.1 |
| −20.48367 | 6.07214 | −0.1 |
| −20.59821 | 6.01782 | −0.1 |
| −20.65788 | 5.96163 | −0.1 |
| −20.69429 | 5.91858 | −0.1 |
| −20.88853 | 6.50195 | 0 |
| −20.93231 | 6.45056 | 0 |
| −20.98363 | 6.36694 | 0 |
| −21.0296 | 6.22265 | 0 |
| −21.03947 | 6.01186 | 0 |
| −20.99066 | 5.74059 | 0 |
| −20.87461 | 5.41671 | 0 |
| −20.68928 | 5.04515 | 0 |
| −20.43405 | 4.62895 | 0 |
| −20.10928 | 4.17034 | 0 |
| −19.71458 | 3.67222 | 0 |
| −19.24834 | 3.13926 | 0 |
| −18.70711 | 2.57915 | 0 |
| −18.08618 | 2.00296 | 0 |
| −17.38005 | 1.42574 | 0 |
| −16.5836 | 0.8666 | 0 |
| −15.6935 | 0.34882 | 0 |
| −14.70963 | −0.10001 | 0 |
| −13.63758 | −0.44978 | 0 |
| −12.49028 | −0.66916 | 0 |
| −11.28944 | −0.72916 | 0 |
| −10.06538 | −0.60709 | 0 |
| −8.85331 | −0.29658 | 0 |
| −7.68545 | 0.19088 | 0 |
| −6.58373 | 0.82823 | 0 |
| −5.55887 | 1.58347 | 0 |
| −4.61579 | 2.42858 | 0 |
| −3.7477 | 3.33166 | 0 |
| −2.94594 | 4.26722 | 0 |
| −2.20444 | 5.21694 | 0 |
| −1.52143 | 6.16847 | 0 |
| −0.88708 | 7.10545 | 0 |
| −0.29735 | 8.0173 | 0 |
| 0.24737 | 8.89734 | 0 |
| 0.75172 | 9.73656 | 0 |
| 1.21694 | 10.52887 | 0 |
| 1.64243 | 11.27013 | 0 |
| 2.02965 | 11.95571 | 0 |
| 2.37884 | 12.58257 | 0 |
| 2.69 | 13.14868 | 0 |
| 2.96387 | 13.65255 | 0 |
| 3.20124 | 14.09361 | 0 |
| 3.40321 | 14.47228 | 0 |
| 3.57119 | 14.7898 | 0 |
| 3.70707 | 15.04848 | 0 |
| 3.81319 | 15.25149 | 0 |
| 3.84688 | 15.4193 | 0 |
| 3.80975 | 15.53284 | 0 |
| 3.76379 | 15.59257 | 0 |
| 3.71872 | 15.6289 | 0 |
| 3.67498 | 15.65239 | 0 |
| 3.61306 | 15.67088 | 0 |
| 3.51059 | 15.67057 | 0 |
| 3.37831 | 15.607 | 0 |
| 3.25998 | 15.45014 | 0 |
| 3.12063 | 15.24186 | 0 |
| 2.94961 | 14.98559 | 0 |
| 2.74571 | 14.67914 | 0 |
| 2.50786 | 14.32141 | 0 |
| 2.23571 | 13.91171 | 0 |
| 1.92857 | 13.45058 | 0 |
| 1.58656 | 12.93894 | 0 |
| 1.20878 | 12.37919 | 0 |
| 0.79466 | 11.77433 | 0 |
| 0.34419 | 11.12775 | 0 |
| −0.14536 | 10.44546 | 0 |
| −0.67482 | 9.73297 | 0 |
| −1.24537 | 8.99681 | 0 |
| −1.86229 | 8.24767 | 0 |
| −2.5268 | 7.49427 | 0 |
| −3.24083 | 6.74722 | 0 |
| −4.00943 | 6.02198 | 0 |
| −4.83534 | 5.33486 | 0 |
| −5.71627 | 4.69958 | 0 |
| −6.65057 | 4.13452 | 0 |
| −7.63242 | 3.65742 | 0 |
| −8.6506 | 3.28143 | 0 |
| −9.6897 | 3.01324 | 0 |
| −10.73267 | 2.85412 | 0 |
| −11.76242 | 2.79941 | 0 |
| −12.76341 | 2.84038 | 0 |
| −13.72232 | 2.96646 | 0 |
| −14.62807 | 3.16611 | 0 |
| −15.47195 | 3.42668 | 0 |
| −16.24749 | 3.7351 | 0 |
| −16.9511 | 4.07688 | 0 |
| −17.58167 | 4.43773 | 0 |
| −18.14033 | 4.80398 | 0 |
| −18.63043 | 5.16265 | 0 |
| −19.05691 | 5.5021 | 0 |
| −19.42614 | 5.81188 | 0 |
| −19.74499 | 6.08329 | 0 |
| −20.02098 | 6.3084 | 0 |
| −20.2616 | 6.47923 | 0 |
| −20.47223 | 6.58685 | 0 |
| −20.65043 | 6.61923 | 0 |
| −20.77635 | 6.5884 | 0 |
| −20.84646 | 6.54172 | 0 |
| −20.88853 | 6.50195 | 0 |

TABLE 1-continued

| X | Y | Z' |
|---|---|---|
| −21.08205 | 7.08272 | 0.1 |
| −21.12844 | 7.03159 | 0.1 |
| −21.17798 | 6.94434 | 0.1 |
| −21.21741 | 6.79457 | 0.1 |
| −21.21869 | 6.57878 | 0.1 |
| −21.16259 | 6.30256 | 0.1 |
| −21.0408 | 5.97248 | 0.1 |
| −20.85073 | 5.59278 | 0.1 |
| −20.59195 | 5.1658 | 0.1 |
| −20.26516 | 4.69308 | 0.1 |
| −19.87068 | 4.17656 | 0.1 |
| −19.40739 | 3.62002 | 0.1 |
| −18.87221 | 3.03011 | 0.1 |
| −18.26005 | 2.41721 | 0.1 |
| −17.56434 | 1.79603 | 0.1 |
| −16.77795 | 1.18624 | 0.1 |
| −15.89482 | 0.61273 | 0.1 |
| −14.9116 | 0.10664 | 0.1 |
| −13.83099 | −0.29578 | 0.1 |
| −12.66501 | −0.55499 | 0.1 |
| −11.43809 | −0.63477 | 0.1 |
| −10.1864 | −0.50887 | 0.1 |
| −8.9512 | −0.17379 | 0.1 |
| −7.76891 | 0.35211 | 0.1 |
| −6.66074 | 1.03491 | 0.1 |
| −5.63542 | 1.83723 | 0.1 |
| −4.69437 | 2.72689 | 0.1 |
| −3.83145 | 3.67365 | 0.1 |
| −3.03737 | 4.65193 | 0.1 |
| −2.30461 | 5.64255 | 0.1 |
| −1.62978 | 6.63217 | 0.1 |
| −1.00514 | 7.6062 | 0.1 |
| −0.42556 | 8.55348 | 0.1 |
| 0.10987 | 9.46646 | 0.1 |
| 0.60463 | 10.33695 | 0.1 |
| 1.06068 | 11.15845 | 0.1 |
| 1.47801 | 11.92641 | 0.1 |
| 1.85771 | 12.63646 | 0.1 |
| 2.20032 | 13.28536 | 0.1 |
| 2.50599 | 13.87101 | 0.1 |
| 2.7753 | 14.39198 | 0.1 |
| 3.00903 | 14.84775 | 0.1 |
| 3.20819 | 15.23884 | 0.1 |
| 3.37408 | 15.5666 | 0.1 |
| 3.50844 | 15.83349 | 0.1 |
| 3.61341 | 16.04292 | 0.1 |
| 3.64279 | 16.21545 | 0.1 |
| 3.60122 | 16.33033 | 0.1 |
| 3.5522 | 16.38979 | 0.1 |
| 3.50484 | 16.42531 | 0.1 |
| 3.45899 | 16.44774 | 0.1 |
| 3.39459 | 16.46422 | 0.1 |
| 3.2894 | 16.45923 | 0.1 |
| 3.15711 | 16.38668 | 0.1 |
| 3.04196 | 16.22075 | 0.1 |
| 2.90598 | 16.00189 | 0.1 |
| 2.7391 | 15.73264 | 0.1 |
| 2.5401 | 15.41072 | 0.1 |
| 2.308 | 15.03493 | 0.1 |
| 2.04234 | 14.6046 | 0.1 |
| 1.74256 | 14.12019 | 0.1 |
| 1.40862 | 13.58271 | 0.1 |
| 1.0396 | 12.99454 | 0.1 |
| 0.63511 | 12.35857 | 0.1 |
| 0.1947 | 11.67848 | 0.1 |
| −0.28421 | 10.96005 | 0.1 |
| −0.80231 | 10.20866 | 0.1 |
| −1.36165 | 9.43137 | 0.1 |
| −1.96698 | 8.63813 | 0.1 |
| −2.61976 | 7.83766 | 0.1 |
| −3.32323 | 7.04134 | 0.1 |
| −4.08258 | 6.26421 | 0.1 |
| −4.90054 | 5.52179 | 0.1 |
| −5.77701 | 4.82978 | 0.1 |
| −6.71185 | 4.20813 | 0.1 |
| −7.70069 | 3.67712 | 0.1 |
| −8.73338 | 3.25419 | 0.1 |
| −9.79472 | 2.95218 | 0.1 |
| −10.86551 | 2.7785 | 0.1 |
| −11.92476 | 2.73208 | 0.1 |
| −12.95231 | 2.80385 | 0.1 |
| −13.93131 | 2.97826 | 0.1 |
| −14.84926 | 3.23667 | 0.1 |
| −15.6981 | 3.55927 | 0.1 |
| −16.4732 | 3.92753 | 0.1 |
| −17.17275 | 4.32437 | 0.1 |
| −17.79713 | 4.73442 | 0.1 |
| −18.34861 | 5.14384 | 0.1 |
| −18.83121 | 5.5401 | 0.1 |
| −19.25048 | 5.912 | 0.1 |
| −19.61368 | 6.24913 | 0.1 |
| −19.92776 | 6.5436 | 0.1 |
| −20.19996 | 6.78855 | 0.1 |
| −20.43748 | 6.97729 | 0.1 |
| −20.6448 | 7.10408 | 0.1 |
| −20.82203 | 7.16073 | 0.1 |
| −20.95541 | 7.15356 | 0.1 |
| −21.03459 | 7.11867 | 0.1 |
| −21.08205 | 7.08272 | 0.1 |
| −21.2461 | 7.55639 | 0.2 |
| −21.29448 | 7.50524 | 0.2 |
| −21.34242 | 7.41485 | 0.2 |
| −21.37621 | 7.26058 | 0.2 |
| −21.37028 | 7.0406 | 0.2 |
| −21.30814 | 6.75998 | 0.2 |
| −21.18174 | 6.42421 | 0.2 |
| −20.98784 | 6.03707 | 0.2 |
| −20.72593 | 5.60046 | 0.2 |
| −20.39673 | 5.11566 | 0.2 |
| −20.0009 | 4.58411 | 0.2 |
| −19.53757 | 4.00913 | 0.2 |
| −19.004 | 3.39676 | 0.2 |
| −18.39496 | 2.75697 | 0.2 |
| −17.70325 | 2.10424 | 0.2 |
| −16.92044 | 1.45857 | 0.2 |
| −16.03858 | 0.84597 | 0.2 |
| −15.05189 | 0.30017 | 0.2 |
| −13.96078 | −0.13799 | 0.2 |
| −12.77651 | −0.42243 | 0.2 |
| −11.52587 | −0.51085 | 0.2 |
| −10.2503 | −0.37412 | 0.2 |
| −8.99655 | −0.01134 | 0.2 |
| −7.80387 | 0.55297 | 0.2 |
| −6.69263 | 1.27894 | 0.2 |
| −5.66942 | 2.12485 | 0.2 |
| −4.73238 | 3.05534 | 0.2 |
| −3.87591 | 4.04164 | 0.2 |
| −3.09022 | 5.05827 | 0.2 |
| −2.36659 | 6.08545 | 0.2 |
| −1.70025 | 7.1091 | 0.2 |
| −1.08525 | 8.1161 | 0.2 |
| −0.51562 | 9.09481 | 0.2 |
| 0.01075 | 10.03705 | 0.2 |
| 0.49628 | 10.93523 | 0.2 |
| 0.94354 | 11.78256 | 0.2 |
| 1.35306 | 12.57418 | 0.2 |
| 1.72556 | 13.3059 | 0.2 |
| 2.06188 | 13.97432 | 0.2 |
| 2.36227 | 14.57729 | 0.2 |
| 2.62718 | 15.11345 | 0.2 |
| 2.85739 | 15.58229 | 0.2 |
| 3.05381 | 15.98442 | 0.2 |
| 3.21762 | 16.3213 | 0.2 |
| 3.35046 | 16.59551 | 0.2 |
| 3.45429 | 16.81065 | 0.2 |
| 3.47973 | 16.98729 | 0.2 |
| 3.43422 | 17.10326 | 0.2 |
| 3.38251 | 17.16242 | 0.2 |
| 3.33314 | 17.19717 | 0.2 |
| 3.28541 | 17.21861 | 0.2 |
| 3.21884 | 17.23321 | 0.2 |
| 3.11137 | 17.22388 | 0.2 |
| 2.97931 | 17.14331 | 0.2 |
| 2.86717 | 16.9694 | 0.2 |
| 2.7343 | 16.74116 | 0.2 |
| 2.57122 | 16.4604 | 0.2 |

TABLE 1-continued

| X | Y | Z' |
|---|---|---|
| 2.37671 | 16.12479 | 0.2 |
| 2.14984 | 15.73302 | 0.2 |
| 1.89006 | 15.28446 | 0.2 |
| 1.5969 | 14.7795 | 0.2 |
| 1.27019 | 14.21924 | 0.2 |
| 0.90898 | 13.60604 | 0.2 |
| 0.51303 | 12.9427 | 0.2 |
| 0.08154 | 12.23313 | 0.2 |
| −0.38792 | 11.48294 | 0.2 |
| −0.89592 | 10.69741 | 0.2 |
| −1.44524 | 9.88399 | 0.2 |
| −2.0401 | 9.05205 | 0.2 |
| −2.68212 | 8.21026 | 0.2 |
| −3.37565 | 7.37058 | 0.2 |
| −4.12598 | 6.54764 | 0.2 |
| −4.9357 | 5.75627 | 0.2 |
| −5.80669 | 5.01367 | 0.2 |
| −6.74026 | 4.34095 | 0.2 |
| −7.73353 | 3.76049 | 0.2 |
| −8.7776 | 3.29341 | 0.2 |
| −9.85776 | 2.958 | 0.2 |
| −10.95315 | 2.76713 | 0.2 |
| −12.039 | 2.723 | 0.2 |
| −13.09064 | 2.81611 | 0.2 |
| −14.0879 | 3.02655 | 0.2 |
| −15.01715 | 3.32958 | 0.2 |
| −15.87124 | 3.69943 | 0.2 |
| −16.64738 | 4.11321 | 0.2 |
| −17.34536 | 4.5518 | 0.2 |
| −17.9668 | 4.99901 | 0.2 |
| −18.51478 | 5.44096 | 0.2 |
| −18.99372 | 5.86552 | 0.2 |
| −19.40955 | 6.26183 | 0.2 |
| −19.77022 | 6.61946 | 0.2 |
| −20.08259 | 6.93115 | 0.2 |
| −20.35371 | 7.1907 | 0.2 |
| −20.59054 | 7.39221 | 0.2 |
| −20.79672 | 7.53195 | 0.2 |
| −20.97307 | 7.60446 | 0.2 |
| −21.10963 | 7.61439 | 0.2 |
| −21.19469 | 7.58925 | 0.2 |
| −21.2461 | 7.55639 | 0.2 |
| −21.36575 | 7.86861 | 0.3 |
| −21.41524 | 7.81706 | 0.3 |
| −21.46188 | 7.72429 | 0.3 |
| −21.49147 | 7.56674 | 0.3 |
| −21.48025 | 7.34366 | 0.3 |
| −21.41388 | 7.05958 | 0.3 |
| −21.28464 | 6.71913 | 0.3 |
| −21.08861 | 6.32581 | 0.3 |
| −20.82469 | 5.88153 | 0.3 |
| −20.49304 | 5.38779 | 0.3 |
| −20.09402 | 4.84625 | 0.3 |
| −19.62661 | 4.26037 | 0.3 |
| −19.0882 | 3.63611 | 0.3 |
| −18.47356 | 2.9834 | 0.3 |
| −17.77547 | 2.31672 | 0.3 |
| −16.9851 | 1.65638 | 0.3 |
| −16.09384 | 1.02918 | 0.3 |
| −15.09499 | 0.47051 | 0.3 |
| −13.98826 | 0.02404 | 0.3 |
| −12.7852 | −0.26031 | 0.3 |
| −11.51493 | −0.33692 | 0.3 |
| −10.22277 | −0.17623 | 0.3 |
| −8.95885 | 0.21969 | 0.3 |
| −7.76233 | 0.82176 | 0.3 |
| −6.65293 | 1.58596 | 0.3 |
| −5.63473 | 2.46844 | 0.3 |
| −4.70362 | 3.43249 | 0.3 |
| −3.85438 | 4.45059 | 0.3 |
| −3.07684 | 5.4975 | 0.3 |
| −2.36153 | 6.55328 | 0.3 |
| −1.70292 | 7.60356 | 0.3 |
| −1.09623 | 8.63613 | 0.3 |
| −0.53489 | 9.6391 | 0.3 |
| −0.01612 | 10.60392 | 0.3 |
| 0.46183 | 11.52342 | 0.3 |
| 0.90196 | 12.3906 | 0.3 |
| 1.3051 | 13.20042 | 0.3 |
| 1.67176 | 13.9488 | 0.3 |
| 2.00296 | 14.63224 | 0.3 |
| 2.29901 | 15.24856 | 0.3 |
| 2.5603 | 15.79643 | 0.3 |
| 2.78755 | 16.27538 | 0.3 |
| 2.98164 | 16.68606 | 0.3 |
| 3.14366 | 17.03002 | 0.3 |
| 3.27517 | 17.30993 | 0.3 |
| 3.37799 | 17.52951 | 0.3 |
| 3.4004 | 17.70928 | 0.3 |
| 3.35186 | 17.82605 | 0.3 |
| 3.2981 | 17.88496 | 0.3 |
| 3.2472 | 17.91908 | 0.3 |
| 3.19807 | 17.93971 | 0.3 |
| 3.12989 | 17.95281 | 0.3 |
| 3.02081 | 17.94009 | 0.3 |
| 2.88912 | 17.85345 | 0.3 |
| 2.77946 | 17.67359 | 0.3 |
| 2.64905 | 17.43834 | 0.3 |
| 2.48895 | 17.14902 | 0.3 |
| 2.2979 | 16.80322 | 0.3 |
| 2.07503 | 16.3996 | 0.3 |
| 1.81966 | 15.93756 | 0.3 |
| 1.53139 | 15.41745 | 0.3 |
| 1.20994 | 14.84041 | 0.3 |
| 0.85434 | 14.20884 | 0.3 |
| 0.46448 | 13.52545 | 0.3 |
| 0.03929 | 12.79431 | 0.3 |
| −0.42349 | 12.02089 | 0.3 |
| −0.92429 | 11.2104 | 0.3 |
| −1.46632 | 10.37048 | 0.3 |
| −2.05338 | 9.5101 | 0.3 |
| −2.6871 | 8.63779 | 0.3 |
| −3.37244 | 7.76572 | 0.3 |
| −4.11472 | 6.90818 | 0.3 |
| −4.9163 | 6.07929 | 0.3 |
| −5.78044 | 5.29696 | 0.3 |
| −6.70956 | 4.58279 | 0.3 |
| −7.70212 | 3.96028 | 0.3 |
| −8.75084 | 3.45282 | 0.3 |
| −9.84152 | 3.08281 | 0.3 |
| −10.95322 | 2.86724 | 0.3 |
| −12.05862 | 2.81137 | 0.3 |
| −13.12968 | 2.90622 | 0.3 |
| −14.14344 | 3.12936 | 0.3 |
| −15.08512 | 3.45207 | 0.3 |
| −15.94791 | 3.84462 | 0.3 |
| −16.73016 | 4.28106 | 0.3 |
| −17.43268 | 4.74075 | 0.3 |
| −18.0578 | 5.20684 | 0.3 |
| −18.60901 | 5.66533 | 0.3 |
| −19.09086 | 6.10432 | 0.3 |
| −19.50939 | 6.51308 | 0.3 |
| −19.87284 | 6.88118 | 0.3 |
| −20.18801 | 7.20156 | 0.3 |
| −20.46182 | 7.46829 | 0.3 |
| −20.70104 | 7.67581 | 0.3 |
| −20.90876 | 7.82143 | 0.3 |
| −21.08578 | 7.90133 | 0.3 |
| −21.22396 | 7.91985 | 0.3 |
| −21.31208 | 7.89994 | 0.3 |
| −21.36575 | 7.86861 | 0.3 |
| −21.44097 | 8.01938 | 0.4 |
| −21.4907 | 7.96704 | 0.4 |
| −21.53637 | 7.87261 | 0.4 |
| −21.56318 | 7.71288 | 0.4 |
| −21.54855 | 7.48769 | 0.4 |
| −21.47971 | 7.20112 | 0.4 |
| −21.3494 | 6.85704 | 0.4 |
| −21.15295 | 6.45892 | 0.4 |
| −20.88819 | 6.00896 | 0.4 |
| −20.55413 | 5.50947 | 0.4 |
| −20.15017 | 4.96298 | 0.4 |
| −19.67469 | 4.37371 | 0.4 |
| −19.12498 | 3.74805 | 0.4 |
| −18.49603 | 3.09626 | 0.4 |
| −17.78105 | 2.43306 | 0.4 |

TABLE 1-continued

| X | Y | Z' |
|---|---|---|
| −16.97174 | 1.77909 | 0.4 |
| −16.06011 | 1.16165 | 0.4 |
| −15.0401 | 0.61708 | 0.4 |
| −13.91246 | 0.1902 | 0.4 |
| −12.69039 | −0.06794 | 0.4 |
| −11.40537 | −0.1116 | 0.4 |
| −10.10491 | 0.08637 | 0.4 |
| −8.83985 | 0.52049 | 0.4 |
| −7.6462 | 1.15913 | 0.4 |
| −6.54337 | 1.95624 | 0.4 |
| −5.53276 | 2.86804 | 0.4 |
| −4.60927 | 3.85822 | 0.4 |
| −3.76783 | 4.90029 | 0.4 |
| −2.99802 | 5.96943 | 0.4 |
| −2.29008 | 7.04587 | 0.4 |
| −1.63835 | 8.11537 | 0.4 |
| −1.03854 | 9.16614 | 0.4 |
| −0.48378 | 10.18622 | 0.4 |
| 0.02893 | 11.16698 | 0.4 |
| 0.50103 | 12.10145 | 0.4 |
| 0.93572 | 12.98251 | 0.4 |
| 1.33398 | 13.80509 | 0.4 |
| 1.69618 | 14.56513 | 0.4 |
| 2.02347 | 15.2591 | 0.4 |
| 2.31615 | 15.88478 | 0.4 |
| 2.57457 | 16.4409 | 0.4 |
| 2.79946 | 16.92697 | 0.4 |
| 2.99163 | 17.3437 | 0.4 |
| 3.15214 | 17.69267 | 0.4 |
| 3.2825 | 17.97661 | 0.4 |
| 3.38442 | 18.19935 | 0.4 |
| 3.40477 | 18.38129 | 0.4 |
| 3.35416 | 18.4986 | 0.4 |
| 3.299 | 18.55733 | 0.4 |
| 3.24704 | 18.59099 | 0.4 |
| 3.19699 | 18.61102 | 0.4 |
| 3.12777 | 18.62301 | 0.4 |
| 3.01775 | 18.60785 | 0.4 |
| 2.88657 | 18.51713 | 0.4 |
| 2.77878 | 18.33331 | 0.4 |
| 2.65021 | 18.09351 | 0.4 |
| 2.49229 | 17.79861 | 0.4 |
| 2.30374 | 17.44623 | 0.4 |
| 2.08366 | 17.03499 | 0.4 |
| 1.83129 | 16.56433 | 0.4 |
| 1.54624 | 16.03459 | 0.4 |
| 1.22816 | 15.44695 | 0.4 |
| 0.87606 | 14.8038 | 0.4 |
| 0.48989 | 14.10784 | 0.4 |
| 0.06851 | 13.36318 | 0.4 |
| −0.39025 | 12.57523 | 0.4 |
| −0.88667 | 11.7491 | 0.4 |
| −1.42404 | 10.89245 | 0.4 |
| −2.00591 | 10.01399 | 0.4 |
| −2.63371 | 9.12206 | 0.4 |
| −3.31254 | 8.22868 | 0.4 |
| −4.04775 | 7.34784 | 0.4 |
| −4.84134 | 6.49296 | 0.4 |
| −5.69727 | 5.68188 | 0.4 |
| −6.61869 | 4.93606 | 0.4 |
| −7.60511 | 4.27915 | 0.4 |
| −8.65103 | 3.73526 | 0.4 |
| −9.7428 | 3.3293 | 0.4 |
| −10.861 | 3.08081 | 0.4 |
| −11.97762 | 2.99795 | 0.4 |
| −13.06282 | 3.07338 | 0.4 |
| −14.09151 | 3.28464 | 0.4 |
| −15.04747 | 3.60136 | 0.4 |
| −15.92334 | 3.99178 | 0.4 |
| −16.71759 | 4.42807 | 0.4 |
| −17.43137 | 4.88836 | 0.4 |
| −18.06723 | 5.35518 | 0.4 |
| −18.6287 | 5.81434 | 0.4 |
| −19.1202 | 6.25395 | 0.4 |
| −19.54764 | 6.66329 | 0.4 |
| −19.91914 | 7.03184 | 0.4 |
| −20.24158 | 7.35236 | 0.4 |
| −20.52173 | 7.6189 | 0.4 |
| −20.76625 | 7.82588 | 0.4 |
| −20.97803 | 7.9708 | 0.4 |
| −21.15753 | 8.05066 | 0.4 |
| −21.29722 | 8.07014 | 0.4 |
| −21.38655 | 8.05086 | 0.4 |
| −21.44097 | 8.01938 | 0.4 |
| −21.45045 | 8.0066 | 0.5 |
| −21.49963 | 7.95323 | 0.5 |
| −21.54492 | 7.85801 | 0.5 |
| −21.5702 | 7.69715 | 0.5 |
| −21.55353 | 7.47088 | 0.5 |
| −21.48371 | 7.18295 | 0.5 |
| −21.35469 | 6.83629 | 0.5 |
| −21.16089 | 6.43422 | 0.5 |
| −20.89818 | 5.9799 | 0.5 |
| −20.56338 | 5.47707 | 0.5 |
| −20.1539 | 4.9302 | 0.5 |
| −19.66688 | 4.34519 | 0.5 |
| −19.09938 | 3.72959 | 0.5 |
| −18.44702 | 3.09433 | 0.5 |
| −17.70429 | 2.45439 | 0.5 |
| −16.86466 | 1.83049 | 0.5 |
| −15.9223 | 1.24975 | 0.5 |
| −14.87351 | 0.74833 | 0.5 |
| −13.72178 | 0.36995 | 0.5 |
| −12.48297 | 0.16384 | 0.5 |
| −11.19034 | 0.17272 | 0.5 |
| −9.89118 | 0.41925 | 0.5 |
| −8.63456 | 0.89536 | 0.5 |
| −7.4513 | 1.56898 | 0.5 |
| −6.36029 | 2.39382 | 0.5 |
| −5.36022 | 3.32763 | 0.5 |
| −4.44647 | 4.33644 | 0.5 |
| −3.61375 | 5.3945 | 0.5 |
| −2.85153 | 6.47759 | 0.5 |
| −2.15029 | 7.56654 | 0.5 |
| −1.50485 | 8.64758 | 0.5 |
| −0.91069 | 9.70891 | 0.5 |
| −0.36098 | 10.73871 | 0.5 |
| 0.14703 | 11.72852 | 0.5 |
| 0.61485 | 12.67134 | 0.5 |
| 1.04567 | 13.5601 | 0.5 |
| 1.4404 | 14.38975 | 0.5 |
| 1.79943 | 15.15623 | 0.5 |
| 2.12388 | 15.85602 | 0.5 |
| 2.41406 | 16.4869 | 0.5 |
| 2.67031 | 17.0476 | 0.5 |
| 2.89333 | 17.53766 | 0.5 |
| 3.08394 | 17.95778 | 0.5 |
| 3.24317 | 18.30958 | 0.5 |
| 3.3725 | 18.59581 | 0.5 |
| 3.47362 | 18.82034 | 0.5 |
| 3.49285 | 19.00346 | 0.5 |
| 3.44109 | 19.12103 | 0.5 |
| 3.38518 | 19.17964 | 0.5 |
| 3.33265 | 19.21301 | 0.5 |
| 3.2821 | 19.23264 | 0.5 |
| 3.21234 | 19.24392 | 0.5 |
| 3.10191 | 19.22721 | 0.5 |
| 2.97133 | 19.13404 | 0.5 |
| 2.86477 | 18.94805 | 0.5 |
| 2.7373 | 18.70586 | 0.5 |
| 2.58062 | 18.40809 | 0.5 |
| 2.39339 | 18.05237 | 0.5 |
| 2.1747 | 17.6373 | 0.5 |
| 1.92368 | 17.1624 | 0.5 |
| 1.63992 | 16.62797 | 0.5 |
| 1.32301 | 16.03527 | 0.5 |
| 0.97194 | 15.38668 | 0.5 |
| 0.58669 | 14.68491 | 0.5 |
| 0.16616 | 13.93404 | 0.5 |
| −0.29175 | 13.13944 | 0.5 |
| −0.7872 | 12.30618 | 0.5 |
| −1.32326 | 11.44175 | 0.5 |
| −1.90336 | 10.55476 | 0.5 |
| −2.52864 | 9.6533 | 0.5 |
| −3.20388 | 8.74903 | 0.5 |
| −3.93439 | 7.85563 | 0.5 |

TABLE 1-continued

| X | Y | Z' |
|---|---|---|
| −4.72186 | 6.9859 | 0.5 |
| −5.57016 | 6.15698 | 0.5 |
| −6.48311 | 5.39005 | 0.5 |
| −7.45756 | 4.70356 | 0.5 |
| −8.49152 | 4.12263 | 0.5 |
| −9.57373 | 3.67424 | 0.5 |
| −10.6874 | 3.3795 | 0.5 |
| −11.8061 | 3.2494 | 0.5 |
| −12.89989 | 3.27991 | 0.5 |
| −13.94222 | 3.45144 | 0.5 |
| −14.91482 | 3.73465 | 0.5 |
| −15.80841 | 4.09779 | 0.5 |
| −16.62027 | 4.51216 | 0.5 |
| −17.35098 | 4.95471 | 0.5 |
| −18.0028 | 5.40712 | 0.5 |
| −18.57884 | 5.85478 | 0.5 |
| −19.08324 | 6.28548 | 0.5 |
| −19.52176 | 6.68804 | 0.5 |
| −19.90234 | 7.05165 | 0.5 |
| −20.23185 | 7.36873 | 0.5 |
| −20.51776 | 7.63245 | 0.5 |
| −20.76711 | 7.83657 | 0.5 |
| −20.98342 | 7.97743 | 0.5 |
| −21.16673 | 8.05127 | 0.5 |
| −21.30803 | 8.0639 | 0.5 |
| −21.3968 | 8.0401 | 0.5 |
| −21.45045 | 8.0066 | 0.5 |
| −21.42195 | 7.83302 | 0.6 |
| −21.46979 | 7.77823 | 0.6 |
| −21.51506 | 7.68276 | 0.6 |
| −21.54029 | 7.52151 | 0.6 |
| −21.52335 | 7.29474 | 0.6 |
| −21.45389 | 7.00604 | 0.6 |
| −21.3271 | 6.6577 | 0.6 |
| −21.1365 | 6.25295 | 0.6 |
| −20.87576 | 5.79623 | 0.6 |
| −20.53901 | 5.29309 | 0.6 |
| −20.12114 | 4.75069 | 0.6 |
| −19.61766 | 4.17754 | 0.6 |
| −19.02521 | 3.58329 | 0.6 |
| −18.34017 | 2.98033 | 0.6 |
| −17.55898 | 2.38434 | 0.6 |
| −16.67795 | 1.8161 | 0.6 |
| −15.69491 | 1.30187 | 0.6 |
| −14.61038 | 0.87604 | 0.6 |
| −13.43249 | 0.57794 | 0.6 |
| −12.18036 | 0.4501 | 0.6 |
| −10.88718 | 0.52776 | 0.6 |
| −9.59609 | 0.82691 | 0.6 |
| −8.35109 | 1.33995 | 0.6 |
| −7.1784 | 2.03797 | 0.6 |
| −6.09632 | 2.87945 | 0.6 |
| −5.10394 | 3.82581 | 0.6 |
| −4.19811 | 4.84576 | 0.6 |
| −3.37227 | 5.91295 | 0.6 |
| −2.61555 | 7.00345 | 0.6 |
| −1.91869 | 8.09861 | 0.6 |
| −1.2777 | 9.18554 | 0.6 |
| −0.68649 | 10.2516 | 0.6 |
| −0.13872 | 11.28536 | 0.6 |
| 0.36764 | 12.27878 | 0.6 |
| 0.83455 | 13.22465 | 0.6 |
| 1.26493 | 14.11607 | 0.6 |
| 1.65928 | 14.94815 | 0.6 |
| 2.01808 | 15.71681 | 0.6 |
| 2.34228 | 16.41859 | 0.6 |
| 2.63213 | 17.05132 | 0.6 |
| 2.88794 | 17.61372 | 0.6 |
| 3.11044 | 18.10533 | 0.6 |
| 3.30045 | 18.52685 | 0.6 |
| 3.45907 | 18.87986 | 0.6 |
| 3.5878 | 19.16712 | 0.6 |
| 3.68846 | 19.39245 | 0.6 |
| 3.7077 | 19.57602 | 0.6 |
| 3.65571 | 19.69381 | 0.6 |
| 3.59955 | 19.75242 | 0.6 |
| 3.54678 | 19.78567 | 0.6 |
| 3.49582 | 19.80516 | 0.6 |
| 3.42552 | 19.81598 | 0.6 |
| 3.31469 | 19.79793 | 0.6 |
| 3.18477 | 19.70227 | 0.6 |
| 3.07862 | 19.51456 | 0.6 |
| 2.9506 | 19.2708 | 0.6 |
| 2.7932 | 18.97112 | 0.6 |
| 2.60506 | 18.61313 | 0.6 |
| 2.38525 | 18.19547 | 0.6 |
| 2.13292 | 17.71759 | 0.6 |
| 1.84767 | 17.17983 | 0.6 |
| 1.52917 | 16.58338 | 0.6 |
| 1.17651 | 15.9306 | 0.6 |
| 0.78972 | 15.22417 | 0.6 |
| 0.36802 | 14.46801 | 0.6 |
| −0.09057 | 13.66742 | 0.6 |
| −0.58608 | 12.82741 | 0.6 |
| −1.121 | 11.95506 | 0.6 |
| −1.69888 | 11.05902 | 0.6 |
| −2.3206 | 10.14708 | 0.6 |
| −2.99035 | 9.2303 | 0.6 |
| −3.71371 | 8.32219 | 0.6 |
| −4.49251 | 7.43527 | 0.6 |
| −5.33053 | 6.5859 | 0.6 |
| −6.23167 | 5.79422 | 0.6 |
| −7.19689 | 5.08262 | 0.6 |
| −8.22304 | 4.47377 | 0.6 |
| −9.29884 | 3.99276 | 0.6 |
| −10.40902 | 3.66012 | 0.6 |
| −11.52877 | 3.48714 | 0.6 |
| −12.62946 | 3.47148 | 0.6 |
| −13.68476 | 3.5969 | 0.6 |
| −14.67524 | 3.83672 | 0.6 |
| −15.58976 | 4.16117 | 0.6 |
| −16.42394 | 4.54198 | 0.6 |
| −17.17738 | 4.95543 | 0.6 |
| −17.85169 | 5.38257 | 0.6 |
| −18.44936 | 5.80856 | 0.6 |
| −18.97397 | 6.22088 | 0.6 |
| −19.43087 | 6.60803 | 0.6 |
| −19.82732 | 6.95907 | 0.6 |
| −20.17028 | 7.26572 | 0.6 |
| −20.46764 | 7.52006 | 0.6 |
| −20.72669 | 7.71498 | 0.6 |
| −20.95151 | 7.84492 | 0.6 |
| −21.14107 | 7.90482 | 0.6 |
| −21.2838 | 7.90284 | 0.6 |
| −21.37029 | 7.87016 | 0.6 |
| −21.42195 | 7.83302 | 0.6 |
| −21.4399 | 7.50704 | 0.7 |
| −21.48491 | 7.4498 | 0.7 |
| −21.52917 | 7.35374 | 0.7 |
| −21.55626 | 7.19263 | 0.7 |
| −21.54284 | 6.96536 | 0.7 |
| −21.47658 | 6.67556 | 0.7 |
| −21.35136 | 6.32622 | 0.7 |
| −21.16012 | 5.92118 | 0.7 |
| −20.89551 | 5.46609 | 0.7 |
| −20.55019 | 4.96798 | 0.7 |
| −20.1177 | 4.43619 | 0.7 |
| −19.59262 | 3.88161 | 0.7 |
| −18.97128 | 3.31627 | 0.7 |
| −18.25074 | 2.75458 | 0.7 |
| −17.42912 | 2.21369 | 0.7 |
| −16.50564 | 1.71491 | 0.7 |
| −15.48206 | 1.28371 | 0.7 |
| −14.36384 | 0.95176 | 0.7 |
| −13.16384 | 0.75271 | 0.7 |
| −11.90425 | 0.72063 | 0.7 |
| −10.61736 | 0.88126 | 0.7 |
| −9.34098 | 1.24352 | 0.7 |
| −8.1128 | 1.79875 | 0.7 |
| −6.95363 | 2.52198 | 0.7 |
| −5.88036 | 3.37715 | 0.7 |
| −4.89292 | 4.33085 | 0.7 |
| −3.9897 | 5.3551 | 0.7 |
| −3.16401 | 6.42427 | 0.7 |
| −2.40585 | 7.51555 | 0.7 |
| −1.70738 | 8.61137 | 0.7 |

TABLE 1-continued

| X | Y | Z' |
|---|---|---|
| −1.06496 | 9.69905 | 0.7 |
| −0.4716 | 10.76544 | 0.7 |
| 0.07819 | 11.79958 | 0.7 |
| 0.5861 | 12.79358 | 0.7 |
| 1.05474 | 13.73989 | 0.7 |
| 1.48663 | 14.63177 | 0.7 |
| 1.88216 | 15.46441 | 0.7 |
| 2.24203 | 16.23359 | 0.7 |
| 2.5671 | 16.93591 | 0.7 |
| 2.85756 | 17.5692 | 0.7 |
| 3.11383 | 18.13214 | 0.7 |
| 3.33664 | 18.62426 | 0.7 |
| 3.52683 | 19.04625 | 0.7 |
| 3.68552 | 19.39968 | 0.7 |
| 3.81428 | 19.68732 | 0.7 |
| 3.91496 | 19.91293 | 0.7 |
| 3.93619 | 20.09654 | 0.7 |
| 3.8851 | 20.21487 | 0.7 |
| 3.82925 | 20.27388 | 0.7 |
| 3.77657 | 20.30741 | 0.7 |
| 3.72634 | 20.32684 | 0.7 |
| 3.65704 | 20.33788 | 0.7 |
| 3.54743 | 20.32089 | 0.7 |
| 3.41798 | 20.22824 | 0.7 |
| 3.31206 | 20.04346 | 0.7 |
| 3.18459 | 19.80342 | 0.7 |
| 3.02766 | 19.50844 | 0.7 |
| 2.83982 | 19.15622 | 0.7 |
| 2.61996 | 18.74548 | 0.7 |
| 2.3671 | 18.2758 | 0.7 |
| 2.08069 | 17.74759 | 0.7 |
| 1.76029 | 17.1621 | 0.7 |
| 1.40489 | 16.52175 | 0.7 |
| 1.01433 | 15.82932 | 0.7 |
| 0.58798 | 15.08866 | 0.7 |
| 0.12383 | 14.30511 | 0.7 |
| −0.37826 | 13.48374 | 0.7 |
| −0.92009 | 12.63132 | 0.7 |
| −1.50521 | 11.75651 | 0.7 |
| −2.13432 | 10.86707 | 0.7 |
| −2.8103 | 9.9732 | 0.7 |
| −3.5382 | 9.08807 | 0.7 |
| −4.31951 | 8.22381 | 0.7 |
| −5.15642 | 7.39513 | 0.7 |
| −6.05165 | 6.62026 | 0.7 |
| −7.00532 | 5.91904 | 0.7 |
| −8.01403 | 5.31073 | 0.7 |
| −9.06651 | 4.81667 | 0.7 |
| −10.15142 | 4.45296 | 0.7 |
| −11.24729 | 4.22989 | 0.7 |
| −12.33066 | 4.14662 | 0.7 |
| −13.37869 | 4.19198 | 0.7 |
| −14.37288 | 4.34562 | 0.7 |
| −15.30088 | 4.58316 | 0.7 |
| −16.15597 | 4.88019 | 0.7 |
| −16.93583 | 5.21419 | 0.7 |
| −17.6406 | 5.56653 | 0.7 |
| −18.27166 | 5.92242 | 0.7 |
| −18.83172 | 6.2691 | 0.7 |
| −19.32457 | 6.59552 | 0.7 |
| −19.75583 | 6.89084 | 0.7 |
| −20.13173 | 7.14562 | 0.7 |
| −20.45784 | 7.35249 | 0.7 |
| −20.73969 | 7.50379 | 0.7 |
| −20.97954 | 7.59378 | 0.7 |
| −21.17414 | 7.61889 | 0.7 |
| −21.31257 | 7.59223 | 0.7 |
| −21.39256 | 7.5483 | 0.7 |
| −21.4399 | 7.50704 | 0.7 |
| −21.50429 | 7.0287 | 0.8 |
| −21.54487 | 6.96821 | 0.8 |
| −21.58716 | 6.87121 | 0.8 |
| −21.61794 | 6.71074 | 0.8 |
| −21.61183 | 6.48307 | 0.8 |
| −21.55173 | 6.19178 | 0.8 |
| −21.42759 | 5.84185 | 0.8 |
| −21.23193 | 5.43866 | 0.8 |
| −20.95761 | 4.98914 | 0.8 |
| −20.59714 | 4.50153 | 0.8 |
| −20.14392 | 3.98691 | 0.8 |
| −19.59234 | 3.45818 | 0.8 |
| −18.93857 | 2.93008 | 0.8 |
| −18.18033 | 2.41968 | 0.8 |
| −17.31744 | 1.94646 | 0.8 |
| −16.35236 | 1.5326 | 0.8 |
| −15.2913 | 1.20256 | 0.8 |
| −14.14508 | 0.98345 | 0.8 |
| −12.93096 | 0.90141 | 0.8 |
| −11.67294 | 0.97981 | 0.8 |
| −10.40063 | 1.23352 | 0.8 |
| −9.14527 | 1.66499 | 0.8 |
| −7.93713 | 2.26405 | 0.8 |
| −6.79223 | 3.01053 | 0.8 |
| −5.72565 | 3.8752 | 0.8 |
| −4.73924 | 4.83091 | 0.8 |
| −3.83252 | 5.85289 | 0.8 |
| −2.99983 | 6.9174 | 0.8 |
| −2.23329 | 8.00353 | 0.8 |
| −1.52728 | 9.09518 | 0.8 |
| −0.87757 | 10.17918 | 0.8 |
| −0.27721 | 11.24226 | 0.8 |
| 0.27816 | 12.274 | 0.8 |
| 0.79043 | 13.26632 | 0.8 |
| 1.26292 | 14.21124 | 0.8 |
| 1.69777 | 15.10216 | 0.8 |
| 2.09546 | 15.93422 | 0.8 |
| 2.45719 | 16.70295 | 0.8 |
| 2.78373 | 17.40496 | 0.8 |
| 3.07533 | 18.03807 | 0.8 |
| 3.33259 | 18.60085 | 0.8 |
| 3.55624 | 19.09284 | 0.8 |
| 3.74716 | 19.51473 | 0.8 |
| 3.90648 | 19.86808 | 0.8 |
| 4.03577 | 20.15562 | 0.8 |
| 4.13688 | 20.38115 | 0.8 |
| 4.16234 | 20.56438 | 0.8 |
| 4.11357 | 20.68371 | 0.8 |
| 4.05872 | 20.74368 | 0.8 |
| 4.00649 | 20.77797 | 0.8 |
| 3.95782 | 20.79757 | 0.8 |
| 3.89053 | 20.80949 | 0.8 |
| 3.78331 | 20.79525 | 0.8 |
| 3.65438 | 20.70897 | 0.8 |
| 3.54828 | 20.53053 | 0.8 |
| 3.42188 | 20.29784 | 0.8 |
| 3.26588 | 20.01209 | 0.8 |
| 3.07863 | 19.67119 | 0.8 |
| 2.85873 | 19.27407 | 0.8 |
| 2.60487 | 18.82055 | 0.8 |
| 2.31618 | 18.31123 | 0.8 |
| 1.99188 | 17.74755 | 0.8 |
| 1.63061 | 17.13218 | 0.8 |
| 1.23185 | 16.46812 | 0.8 |
| 0.79482 | 15.75934 | 0.8 |
| 0.31742 | 15.01136 | 0.8 |
| −0.2008 | 14.22953 | 0.8 |
| −0.76118 | 13.4205 | 0.8 |
| −1.36685 | 12.59302 | 0.8 |
| −2.01835 | 11.75497 | 0.8 |
| −2.717 | 10.91577 | 0.8 |
| −3.46633 | 10.08792 | 0.8 |
| −4.2668 | 9.28296 | 0.8 |
| −5.1183 | 8.5136 | 0.8 |
| −6.02098 | 7.79517 | 0.8 |
| −6.97308 | 7.14313 | 0.8 |
| −7.96775 | 6.57268 | 0.8 |
| −8.99669 | 6.09725 | 0.8 |
| −10.04866 | 5.72766 | 0.8 |
| −11.10739 | 5.4698 | 0.8 |
| −12.15574 | 5.32239 | 0.8 |
| −13.17682 | 5.27787 | 0.8 |
| −14.15592 | 5.32289 | 0.8 |
| −15.0818 | 5.44048 | 0.8 |
| −15.94662 | 5.61362 | 0.8 |
| −16.74605 | 5.82385 | 0.8 |
| −17.47825 | 6.05468 | 0.8 |

TABLE 1-continued

| X | Y | Z' |
|---|---|---|
| −18.14302 | 6.29215 | 0.8 |
| −18.74161 | 6.52352 | 0.8 |
| −19.27673 | 6.73659 | 0.8 |
| −19.75123 | 6.92154 | 0.8 |
| −20.16788 | 7.07022 | 0.8 |
| −20.52934 | 7.17457 | 0.8 |
| −20.83614 | 7.22924 | 0.8 |
| −21.08576 | 7.23342 | 0.8 |
| −21.27292 | 7.19352 | 0.8 |
| −21.39523 | 7.13128 | 0.8 |
| −21.46357 | 7.07437 | 0.8 |
| −21.50429 | 7.0287 | 0.8 |
| −21.61119 | 6.41084 | 0.9 |
| −21.64583 | 6.34669 | 0.9 |
| −21.68522 | 6.24838 | 0.9 |
| −21.72118 | 6.08894 | 0.9 |
| −21.72583 | 5.86112 | 0.9 |
| −21.67482 | 5.56781 | 0.9 |
| −21.55161 | 5.21717 | 0.9 |
| −21.34836 | 4.8173 | 0.9 |
| −21.05939 | 4.37668 | 0.9 |
| −20.67819 | 3.90444 | 0.9 |
| −20.19921 | 3.41295 | 0.9 |
| −19.61741 | 2.91675 | 0.9 |
| −18.92892 | 2.43363 | 0.9 |
| −18.13229 | 1.98401 | 0.9 |
| −17.22932 | 1.59062 | 0.9 |
| −16.22636 | 1.27677 | 0.9 |
| −15.1346 | 1.06521 | 0.9 |
| −13.97015 | 0.97626 | 0.9 |
| −12.75343 | 1.02636 | 0.9 |
| −11.50803 | 1.22632 | 0.9 |
| −10.25875 | 1.5797 | 0.9 |
| −9.02944 | 2.08324 | 0.9 |
| −7.84212 | 2.72556 | 0.9 |
| −6.70951 | 3.4919 | 0.9 |
| −5.64511 | 4.3612 | 0.9 |
| −4.6536 | 5.31329 | 0.9 |
| −3.73547 | 6.32654 | 0.9 |
| −2.88722 | 7.3801 | 0.9 |
| −2.10441 | 8.45588 | 0.9 |
| −1.38397 | 9.53929 | 0.9 |
| −0.72036 | 10.616 | 0.9 |
| −0.10761 | 11.67309 | 0.9 |
| 0.45743 | 12.70061 | 0.9 |
| 0.97738 | 13.68992 | 0.9 |
| 1.45629 | 14.63253 | 0.9 |
| 1.89594 | 15.52196 | 0.9 |
| 2.2972 | 16.35312 | 0.9 |
| 2.66189 | 17.12117 | 0.9 |
| 2.99083 | 17.82274 | 0.9 |
| 3.28438 | 18.45555 | 0.9 |
| 3.54343 | 19.01805 | 0.9 |
| 3.7687 | 19.50977 | 0.9 |
| 3.96108 | 19.93139 | 0.9 |
| 4.12171 | 20.28447 | 0.9 |
| 4.25215 | 20.57177 | 0.9 |
| 4.3542 | 20.79707 | 0.9 |
| 4.38621 | 20.97954 | 0.9 |
| 4.3412 | 21.10034 | 0.9 |
| 4.28799 | 21.16185 | 0.9 |
| 4.23656 | 21.19743 | 0.9 |
| 4.18958 | 21.21766 | 0.9 |
| 4.12427 | 21.23097 | 0.9 |
| 4.01936 | 21.22016 | 0.9 |
| 3.89115 | 21.14022 | 0.9 |
| 3.78345 | 20.96884 | 0.9 |
| 3.65686 | 20.74382 | 0.9 |
| 3.50008 | 20.46783 | 0.9 |
| 3.31109 | 20.13906 | 0.9 |
| 3.08805 | 19.7568 | 0.9 |
| 2.82911 | 19.32121 | 0.9 |
| 2.53293 | 18.83326 | 0.9 |
| 2.19811 | 18.29484 | 0.9 |
| 1.82265 | 17.70912 | 0.9 |
| 1.40555 | 17.07954 | 0.9 |
| 0.94544 | 16.41066 | 0.9 |
| 0.43995 | 15.70854 | 0.9 |
| −0.11163 | 14.9791 | 0.9 |
| −0.71075 | 14.2296 | 0.9 |
| −1.3598 | 13.46911 | 0.9 |
| −2.05875 | 12.70585 | 0.9 |
| −2.8077 | 11.94918 | 0.9 |
| −3.60773 | 11.21081 | 0.9 |
| −4.45716 | 10.50122 | 0.9 |
| −5.35331 | 9.83125 | 0.9 |
| −6.29284 | 9.21207 | 0.9 |
| −7.26899 | 8.65409 | 0.9 |
| −8.27418 | 8.1644 | 0.9 |
| −9.29858 | 7.74842 | 0.9 |
| −10.33103 | 7.40853 | 0.9 |
| −11.35989 | 7.14366 | 0.9 |
| −12.3737 | 6.95 | 0.9 |
| −13.36185 | 6.82172 | 0.9 |
| −14.31485 | 6.75159 | 0.9 |
| −15.22454 | 6.73118 | 0.9 |
| −16.08414 | 6.75298 | 0.9 |
| −16.88843 | 6.80384 | 0.9 |
| −17.63388 | 6.8713 | 0.9 |
| −18.31848 | 6.94184 | 0.9 |
| −18.94128 | 7.00201 | 0.9 |
| −19.50149 | 7.04133 | 0.9 |
| −19.998 | 7.05048 | 0.9 |
| −20.42867 | 7.02409 | 0.9 |
| −20.79016 | 6.95993 | 0.9 |
| −21.07828 | 6.86319 | 0.9 |
| −21.29193 | 6.74678 | 0.9 |
| −21.43706 | 6.62934 | 0.9 |
| −21.52726 | 6.53061 | 0.9 |
| −21.57896 | 6.46104 | 0.9 |
| −21.61119 | 6.41084 | 0.9 |
| −21.72613 | 5.7666 | 1 |
| −21.7545 | 5.69925 | 1 |
| −21.79075 | 5.59944 | 1 |
| −21.83181 | 5.44087 | 1 |
| −21.84784 | 5.21318 | 1 |
| −21.80673 | 4.91753 | 1 |
| −21.68478 | 4.56537 | 1 |
| −21.47366 | 4.16832 | 1 |
| −21.16948 | 3.73662 | 1 |
| −20.76712 | 3.28025 | 1 |
| −20.2624 | 2.81278 | 1 |
| −19.65111 | 2.35033 | 1 |
| −18.9298 | 1.91381 | 1 |
| −18.09829 | 1.52723 | 1 |
| −17.16109 | 1.21657 | 1 |
| −16.1289 | 1.00583 | 1 |
| −15.01785 | 0.91514 | 1 |
| −13.84798 | 0.95704 | 1 |
| −12.64083 | 1.1379 | 1 |
| −11.41728 | 1.45649 | 1 |
| −10.19603 | 1.90619 | 1 |
| −8.99389 | 2.47875 | 1 |
| −7.82508 | 3.16171 | 1 |
| −6.70062 | 3.94513 | 1 |
| −5.6331 | 4.81605 | 1 |
| −4.63047 | 5.76138 | 1 |
| −3.69408 | 6.76238 | 1 |
| −2.82324 | 7.80167 | 1 |
| −2.01758 | 8.86453 | 1 |
| −1.27677 | 9.93795 | 1 |
| −0.59358 | 11.00599 | 1 |
| 0.03635 | 12.0564 | 1 |
| 0.61492 | 13.07963 | 1 |
| 1.14582 | 14.06618 | 1 |
| 1.63379 | 15.00702 | 1 |
| 2.08031 | 15.89572 | 1 |
| 2.48682 | 16.7268 | 1 |
| 2.85593 | 17.49504 | 1 |
| 3.18848 | 18.19698 | 1 |
| 3.48507 | 18.83024 | 1 |
| 3.74691 | 19.3931 | 1 |
| 3.97475 | 19.88509 | 1 |
| 4.16945 | 20.30688 | 1 |
| 4.33218 | 20.66004 | 1 |
| 4.46446 | 20.94734 | 1 |

TABLE 1-continued

| X | Y | Z' |
|---|---|---|
| 4.56801 | 21.17259 | 1 |
| 4.60841 | 21.35391 | 1 |
| 4.56818 | 21.47665 | 1 |
| 4.51711 | 21.54023 | 1 |
| 4.46676 | 21.57755 | 1 |
| 4.42078 | 21.59911 | 1 |
| 4.35632 | 21.61433 | 1 |
| 4.25178 | 21.60669 | 1 |
| 4.12435 | 21.5294 | 1 |
| 4.01281 | 21.36216 | 1 |
| 3.88265 | 21.1414 | 1 |
| 3.72073 | 20.8711 | 1 |
| 3.52441 | 20.54992 | 1 |
| 3.29126 | 20.17757 | 1 |
| 3.01867 | 19.75482 | 1 |
| 2.7047 | 19.28316 | 1 |
| 2.34695 | 18.76535 | 1 |
| 1.94264 | 18.20546 | 1 |
| 1.49028 | 17.60766 | 1 |
| 0.98748 | 16.97786 | 1 |
| 0.43178 | 16.32311 | 1 |
| −0.17759 | 15.65024 | 1 |
| −0.84237 | 14.96811 | 1 |
| −1.56334 | 14.28606 | 1 |
| −2.33926 | 13.6127 | 1 |
| −3.16852 | 12.95752 | 1 |
| −4.04883 | 12.33063 | 1 |
| −4.97547 | 11.74036 | 1 |
| −5.94268 | 11.19412 | 1 |
| −6.94232 | 10.69655 | 1 |
| −7.96494 | 10.24874 | 1 |
| −9.00035 | 9.84883 | 1 |
| −10.03801 | 9.49155 | 1 |
| −11.06773 | 9.16942 | 1 |
| −12.08076 | 8.8764 | 1 |
| −13.06992 | 8.60954 | 1 |
| −14.02947 | 8.36967 | 1 |
| −14.95432 | 8.15908 | 1 |
| −15.84008 | 7.9823 | 1 |
| −16.68086 | 7.83521 | 1 |
| −17.47083 | 7.70916 | 1 |
| −18.20433 | 7.59079 | 1 |
| −18.87617 | 7.46708 | 1 |
| −19.48166 | 7.32882 | 1 |
| −20.01579 | 7.16954 | 1 |
| −20.47412 | 6.98826 | 1 |
| −20.85295 | 6.78809 | 1 |
| −21.14996 | 6.57839 | 1 |
| −21.36989 | 6.37109 | 1 |
| −21.51899 | 6.17996 | 1 |
| −21.61123 | 6.01975 | 1 |
| −21.66799 | 5.89974 | 1 |
| −21.70258 | 5.82094 | 1 |
| −21.72613 | 5.7666 | 1 |
| −21.84106 | 5.12237 | 1.1 |
| −21.86327 | 5.05235 | 1.1 |
| −21.89633 | 4.95085 | 1.1 |
| −21.94193 | 4.79261 | 1.1 |
| −21.9694 | 4.56515 | 1.1 |
| −21.93822 | 4.26667 | 1.1 |
| −21.81741 | 3.91192 | 1.1 |
| −21.59792 | 3.51679 | 1.1 |
| −21.27793 | 3.09342 | 1.1 |
| −20.85388 | 2.65276 | 1.1 |
| −20.32315 | 2.20956 | 1.1 |
| −19.6826 | 1.78152 | 1.1 |
| −18.92965 | 1.39273 | 1.1 |
| −18.06614 | 1.07055 | 1.1 |
| −17.10006 | 0.84358 | 1.1 |
| −16.04676 | 0.73535 | 1.1 |
| −14.92669 | 0.76237 | 1.1 |
| −13.76204 | 0.92934 | 1.1 |
| −12.57353 | 1.23352 | 1.1 |
| −11.37777 | 1.6637 | 1.1 |
| −10.18671 | 2.2044 | 1.1 |
| −9.01061 | 2.84289 | 1.1 |
| −7.85688 | 3.565 | 1.1 |
| −6.73586 | 4.36488 | 1.1 |
| −5.66014 | 5.23695 | 1.1 |
| −4.64164 | 6.17563 | 1.1 |
| −3.68272 | 7.16486 | 1.1 |
| −2.78555 | 8.19076 | 1.1 |
| −1.95357 | 9.24184 | 1.1 |
| −1.1893 | 10.30689 | 1.1 |
| −0.48391 | 11.36816 | 1.1 |
| 0.16555 | 12.41397 | 1.1 |
| 0.75978 | 13.43513 | 1.1 |
| 1.30346 | 14.42122 | 1.1 |
| 1.80209 | 15.36257 | 1.1 |
| 2.25691 | 16.25275 | 1.1 |
| 2.66994 | 17.08588 | 1.1 |
| 3.04455 | 17.85629 | 1.1 |
| 3.38171 | 18.56042 | 1.1 |
| 3.68222 | 19.19577 | 1.1 |
| 3.94761 | 19.76047 | 1.1 |
| 4.17867 | 20.254 | 1.1 |
| 4.37627 | 20.67706 | 1.1 |
| 4.54158 | 21.0312 | 1.1 |
| 4.67609 | 21.31924 | 1.1 |
| 4.78147 | 21.54504 | 1.1 |
| 4.83062 | 21.72513 | 1.1 |
| 4.79519 | 21.85007 | 1.1 |
| 4.74627 | 21.91586 | 1.1 |
| 4.69696 | 21.95503 | 1.1 |
| 4.65112 | 21.97847 | 1.1 |
| 4.58619 | 21.99583 | 1.1 |
| 4.47927 | 21.99052 | 1.1 |
| 4.3523 | 21.91176 | 1.1 |
| 4.23568 | 21.74417 | 1.1 |
| 4.09857 | 21.52347 | 1.1 |
| 3.92728 | 21.25378 | 1.1 |
| 3.71819 | 20.93443 | 1.1 |
| 3.4682 | 20.56572 | 1.1 |
| 3.17386 | 20.14916 | 1.1 |
| 2.83246 | 19.68704 | 1.1 |
| 2.44033 | 19.18353 | 1.1 |
| 1.99416 | 18.64376 | 1.1 |
| 1.49175 | 18.07329 | 1.1 |
| 0.92977 | 17.48002 | 1.1 |
| 0.30629 | 16.87207 | 1.1 |
| −0.37961 | 16.25816 | 1.1 |
| −1.1289 | 15.64875 | 1.1 |
| −1.94026 | 15.0532 | 1.1 |
| −2.81029 | 14.48069 | 1.1 |
| −3.7352 | 13.93942 | 1.1 |
| −4.70917 | 13.43704 | 1.1 |
| −5.72455 | 12.97856 | 1.1 |
| −6.77185 | 12.56423 | 1.1 |
| −7.83978 | 12.18794 | 1.1 |
| −8.91691 | 11.83977 | 1.1 |
| −9.99018 | 11.50076 | 1.1 |
| −11.04697 | 11.15202 | 1.1 |
| −12.07549 | 10.77898 | 1.1 |
| −13.06865 | 10.38262 | 1.1 |
| −14.02458 | 9.97589 | 1.1 |
| −14.94583 | 9.57943 | 1.1 |
| −15.83222 | 9.20609 | 1.1 |
| −16.68129 | 8.86275 | 1.1 |
| −17.4854 | 8.54259 | 1.1 |
| −18.23655 | 8.2364 | 1.1 |
| −18.92548 | 7.93153 | 1.1 |
| −19.54568 | 7.62304 | 1.1 |
| −20.09107 | 7.30783 | 1.1 |
| −20.55711 | 6.98852 | 1.1 |
| −20.9419 | 6.66969 | 1.1 |
| −21.24568 | 6.35899 | 1.1 |
| −21.47173 | 6.06607 | 1.1 |
| −21.62664 | 5.80255 | 1.1 |
| −21.72447 | 5.57704 | 1.1 |
| −21.77579 | 5.39665 | 1.1 |
| −21.80675 | 5.26561 | 1.1 |
| −21.82586 | 5.18046 | 1.1 |
| −21.84106 | 5.12237 | 1.1 |
| −21.89853 | 4.80026 | 1.15 |
| −21.9176 | 4.72905 | 1.15 |
| −21.94924 | 4.6267 | 1.15 |

TABLE 1-continued

| X | Y | Z' |
|---|---|---|
| −21.99676 | 4.46834 | 1.15 |
| −22.03003 | 4.24106 | 1.15 |
| −22.00381 | 3.94099 | 1.15 |
| −21.88349 | 3.58457 | 1.15 |
| −21.65958 | 3.19008 | 1.15 |
| −21.33142 | 2.7707 | 1.15 |
| −20.89629 | 2.33787 | 1.15 |
| −20.35244 | 1.90692 | 1.15 |
| −19.69736 | 1.49634 | 1.15 |
| −18.92907 | 1.13178 | 1.15 |
| −18.0507 | 0.8421 | 1.15 |
| −17.0722 | 0.65684 | 1.15 |
| −16.01121 | 0.59883 | 1.15 |
| −14.88998 | 0.68252 | 1.15 |
| −13.73119 | 0.90896 | 1.15 |
| −12.55462 | 1.27155 | 1.15 |
| −11.37456 | 1.7551 | 1.15 |
| −10.19944 | 2.34011 | 1.15 |
| −9.03639 | 3.01163 | 1.15 |
| −7.88961 | 3.75388 | 1.15 |
| −6.76912 | 4.56265 | 1.15 |
| −5.68775 | 5.43554 | 1.15 |
| −4.6598 | 6.37118 | 1.15 |
| −3.68817 | 7.3548 | 1.15 |
| −2.77654 | 8.37435 | 1.15 |
| −1.93002 | 9.41987 | 1.15 |
| −1.15286 | 10.4813 | 1.15 |
| −0.43537 | 11.53988 | 1.15 |
| 0.22478 | 12.58412 | 1.15 |
| 0.82766 | 13.60505 | 1.15 |
| 1.37842 | 14.59176 | 1.15 |
| 1.883 | 15.53421 | 1.15 |
| 2.34251 | 16.42595 | 1.15 |
| 2.75926 | 17.2609 | 1.15 |
| 3.13703 | 18.03314 | 1.15 |
| 3.47685 | 18.73905 | 1.15 |
| 3.77963 | 19.37607 | 1.15 |
| 4.04706 | 19.94225 | 1.15 |
| 4.27997 | 20.43704 | 1.15 |
| 4.47922 | 20.86114 | 1.15 |
| 4.64598 | 21.21614 | 1.15 |
| 4.78175 | 21.50483 | 1.15 |
| 4.88815 | 21.73112 | 1.15 |
| 4.94175 | 21.91058 | 1.15 |
| 4.90873 | 22.03671 | 1.15 |
| 4.86087 | 22.10365 | 1.15 |
| 4.81206 | 22.14377 | 1.15 |
| 4.76604 | 22.16833 | 1.15 |
| 4.70054 | 22.18688 | 1.15 |
| 4.59144 | 22.18251 | 1.15 |
| 4.46446 | 22.10189 | 1.15 |
| 4.34497 | 21.9327 | 1.15 |
| 4.20324 | 21.71085 | 1.15 |
| 4.02571 | 21.4401 | 1.15 |
| 3.80827 | 21.12019 | 1.15 |
| 3.54734 | 20.75181 | 1.15 |
| 3.23909 | 20.33691 | 1.15 |
| 2.88029 | 19.87837 | 1.15 |
| 2.46658 | 19.38129 | 1.15 |
| 1.99456 | 18.85139 | 1.15 |
| 1.4615 | 18.2953 | 1.15 |
| 0.86393 | 17.72203 | 1.15 |
| 0.20038 | 17.1403 | 1.15 |
| −0.53012 | 16.56019 | 1.15 |
| −1.32743 | 15.99231 | 1.15 |
| −2.18861 | 15.44662 | 1.15 |
| −3.11 | 14.93121 | 1.15 |
| −4.08537 | 14.45377 | 1.15 |
| −5.10772 | 14.02017 | 1.15 |
| −6.16808 | 13.63242 | 1.15 |
| −7.2554 | 13.28539 | 1.15 |
| −8.35716 | 12.96497 | 1.15 |
| −9.46064 | 12.65148 | 1.15 |
| −10.551 | 12.31707 | 1.15 |
| −11.611 | 11.9322 | 1.15 |
| −12.62763 | 11.48984 | 1.15 |
| −13.59732 | 11.00611 | 1.15 |
| −14.52618 | 10.51059 | 1.15 |
| −15.42069 | 10.02809 | 1.15 |
| −16.28363 | 9.57497 | 1.15 |
| −17.10833 | 9.14923 | 1.15 |
| −17.88739 | 8.74642 | 1.15 |
| −18.61062 | 8.35574 | 1.15 |
| −19.2685 | 7.96812 | 1.15 |
| −19.85506 | 7.58286 | 1.15 |
| −20.36531 | 7.19914 | 1.15 |
| −20.79587 | 6.82102 | 1.15 |
| −21.1444 | 6.45377 | 1.15 |
| −21.41432 | 6.10649 | 1.15 |
| −21.61168 | 5.78754 | 1.15 |
| −21.74146 | 5.50552 | 1.15 |
| −21.81912 | 5.26938 | 1.15 |
| −21.85479 | 5.08257 | 1.15 |
| −21.87514 | 4.94765 | 1.15 |
| −21.88735 | 4.86007 | 1.15 |
| −21.89853 | 4.80026 | 1.15 |

In the above table, the plane Z'=0 corresponds to the reference plane P0 situated at the base of the profile. This plane P0 is the intersection of the stacking axis AE of the set of vanes with the axisymmetric surface of the hub, i.e. it passes via the intersection between the axis AE and the surface 16A where it is assembled with the inner shroud 16. The plane Z'=1 corresponds to the reference plane P1 situated at the top of the profile. This plane P1 is the intersection between the axis AE and the axisymmetric surface of the casing, i.e. it passes via the intersection of the axis AE with the surface 12A where it is assembled with the outer ring 12.

By convention, the stacking axis AE of the set of vanes, for the vane of a nozzle, is the axis that extends in the radial direction Z and passes through the middle of the inter-vane throat. For a given vane, the inter-vane throat is the location where the distance between the trailing edge of the vane in question and the suction side of the preceding vane in the direction of rotation of the turbine is at a minimum.

This is the axis on which the various X,Y sections of the set of vanes are "stacked" when designing the set of vanes.

As mentioned at the beginning of the present description, the aerodynamic profile of the invention is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile.

The coordinates of the above table are given starting from a value Z'=0 in the reference plane P0. The coordinate Z' is non-dimensional, i.e. for a point P, situated at a distance D from the plane P0 (where D is measured along the axis Z), the value of Z' is D/H, where H represents the total height of the profile as measured between the planes P0 and P1. Naturally, in the table above, by multiplying the coordinate Z' by the height H, it is possible to obtain the complete coordinates of the vane.

By way of example, the total height H may lie in the range 110 centimeters (cm) to 160 cm, and is preferably about 140 cm. The plane P0 is situated at a distance of 270 cm to 370 cm, and is preferably about 327 cm from the axis A.

In the above table, the profile is characterized by fifteen sections at constant Z' coordinates, for which the coordinates X and Y are specified. In each section plane at constant coordinate Z', the section of the profile is given by a continuous and smooth curve, interconnecting all of the points (X,Y). In each section plane, the profile is interpolated so as to generate a uniform profile.

Figure 3:
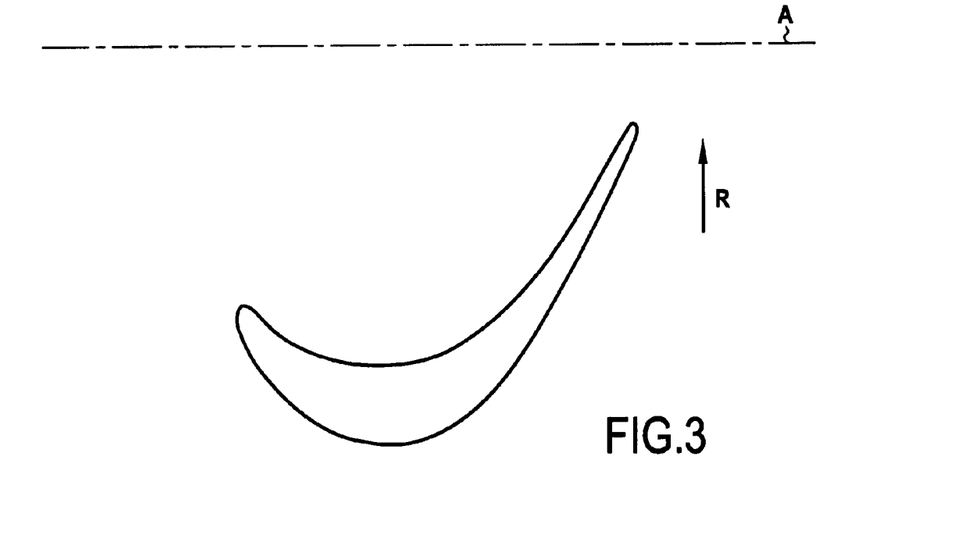
FIG. 3 is a diagrammatic section view of the FIG. 2 vane on an X-Y plane.

FIG. 3 is a diagram of a section of the profile 18 in a plane X,Y parallel to the plane P0. As stated above, the vane D3 is in particular a nozzle vane of the third stage of a turbine. This vane is therefore stationary in rotation. Arrow R shows the direction of rotation of the rotary wheel situated downstream from the nozzle of this stage.

It is advantageous for the nozzle that includes the vane of the invention to have 104 to 124 vanes that present aerodynamic profiles as defined above.

The invention claimed is:

1. An aerodynamic profile for a turbine vane, the profile being, when cold and in a non-coated state, substantially identical to a nominal profile determined by Cartesian coordinates X,Y,Z' given in Table 1, in which the coordinate Z' is a quotient D/H, where D is a distance of a point under consideration from a reference X,Y plane situated at a base of the nominal profile, and H is a height of said profile measured from said reference plane out to the end of the vane, the measurements D and H being taken radially relative to an axis of a turbine, while the coordinate X is measured in an axial direction of the turbine.

2. The aerodynamic profile as claimed in claim 1, wherein said profile is defined within an envelope of ±1 mm in a direction normal to the surface of the nominal profile.

3. The aerodynamic profile as claimed in claim 1, wherein the coordinates X,Y of said profile lie within a range of ±5% relative to the coordinates X,Y of the nominal profile.

4. The aerodynamic profile as claimed in claim 1, wherein the vane is a nozzle vane forming a part of a stator of the turbine.

5. The aerodynamic profile as claimed in claim 4, wherein the vane is a nozzle vane of a third stage of the turbine.

6. The aerodynamic profile as claimed in claim 4, wherein the vane is a vane of a third stage nozzle of the turbine having four stages.

7. A turbine vane, presenting an aerodynamic profile as claimed in claim 1.

8. A turbine, including turbine vanes presenting aerodynamic profiles as claimed in claim 1.

9. A turbine as claimed in claim 8, including a nozzle that is stationary in rotation, having 104 to 124 vanes.

10. A turbine nozzle forming a portion of a turbine stator, wherein all the vanes of the nozzle present an aerodynamic profile as claimed in claim 1.

11. A turbine nozzle as claimed in claim 10, including 104 to 124 vanes.

* * * * *